United States Patent [19]

Khvostantsev

[11] 4,302,168

[45] Nov. 24, 1981

[54] HIGH PRESSURE PRODUCING APPARATUS

[76] Inventor: Lev G. Khvostantsev, mikroraion "V", 7, kv. 20, Troitsk Moskovskoi oblasti, U.S.S.R.

[21] Appl. No.: 198,102
[22] PCT Filed: Nov. 19, 1979
[86] PCT No.: PCT/SU79/00114
§ 371 Date: Jul. 29, 1980
§ 102(e) Date: Jul. 25, 1980
[87] PCT Pub. No.: WO80/01143
PCT Pub. Date: Jun. 12, 1980

[30] Foreign Application Priority Data

Nov. 29, 1978 [SU] U.S.S.R. ............................. 2715511

[51] Int. Cl.³ .............................................. B30B 11/32
[52] U.S. Cl. .............................. 425/77; 425/DIG. 26
[58] Field of Search ......................................... 425/77

[56] References Cited

U.S. PATENT DOCUMENTS

| | | | |
|---|---|---|---|
| 3,075,245 | 1/1963 | Bundy | 425/77 |
| 3,093,862 | 6/1963 | Gerard et al. | 425/77 |
| 3,118,177 | 1/1964 | von Platen | 425/77 |
| 3,241,188 | 3/1966 | Febbo et al. | 425/77 |
| 3,548,190 | 12/1970 | Sclar et al. | 425/77 X |
| 3,659,972 | 5/1972 | Garrett | 425/77 X |
| 3,732,043 | 5/1973 | Bakul et al. | 425/77 |
| 3,854,854 | 12/1974 | Vereschagin et al. | 425/77 |
| 3,895,894 | 7/1975 | Biermann et al. | 425/77 |
| 3,914,078 | 10/1975 | Kendall | 425/77 |
| 3,915,605 | 10/1975 | Vereschagin | 425/77 |

Primary Examiner—J. Howard Flint, Jr.
Attorney, Agent, or Firm—Steinberg & Raskin

[57] ABSTRACT

An apparatus for producing high pressure comprises a multi-die system (1). Each die (2) is made up of two cooperating parts arranged along a longitudinal centerline (3) of the die (2), one part being a working body (4), the other being a base member (8). The working body (4) is also made up of two parts in the direction essentially perpendicular to the longitudinal centerline (3) of the die (2), the parts being a central insert (21) and an encircling ring (22) both arranged coaxially and capable of relative displacement towards a test sample (7). The surface area of an end (23) of the central insert (21) of the working body (4) approximates to or less (in this case less) than the surface area of the central portion (18) of an end (11) of the working body (4). An end (5) of the working body (4) is arranged for direct cooperation with a solid medium (6) which is plastic under pressure and serves to surround a sample (7) being tested. An end (9) of the base member (8) faces a die driving means (10) common to all dies. The space between other opposing ends (11 and 12) of the working body (4) and the base member (8) is filled with a solid medium (13) plastic under pressure. The surfaces of the ends (11) and (12) are provided with identical annular grooves (14 and 15) respectively, the grooves being filled with a solid medium (20) plastic under pressure.

8 Claims, 4 Drawing Figures

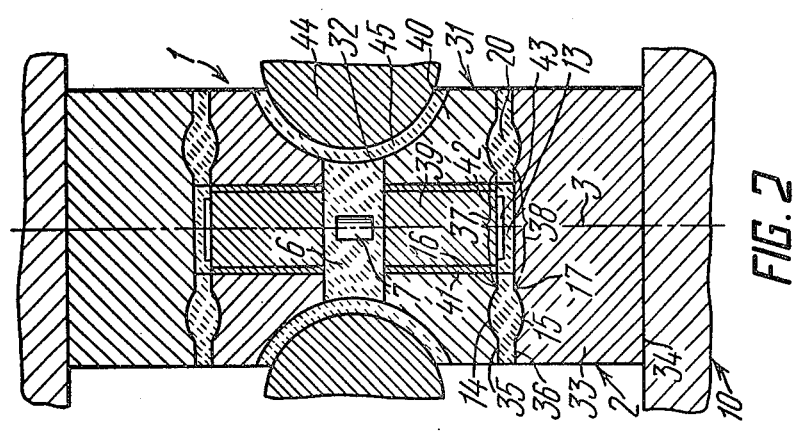
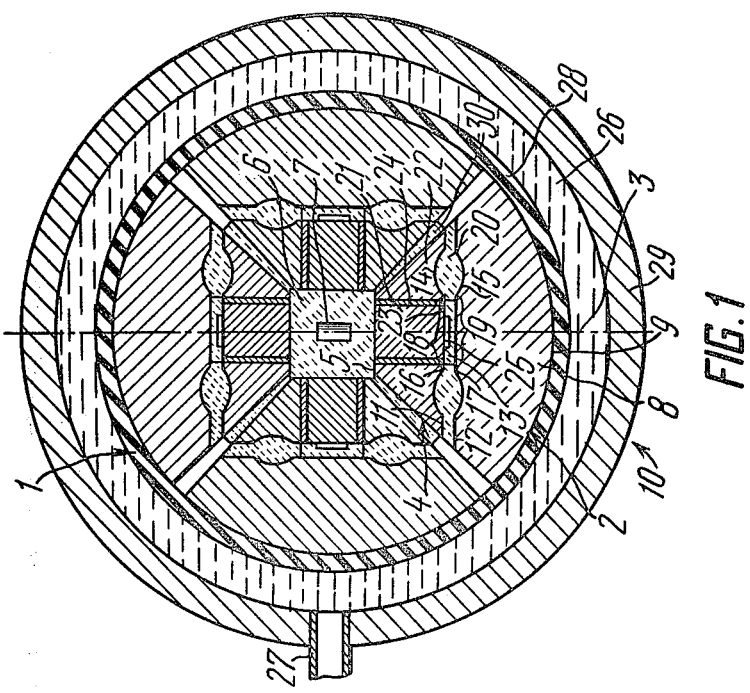

HIGH PRESSURE PRODUCING APPARATUS

FIELD OF THE INVENTION

The present invention relates to machine building, and more particularly to apparatus for producing high pressure.

BACKGROUND ART

Known in the art is a belt-type apparatus for producing high pressure, comprising a pair of punch assemblies the frustoconical end portions of which are enclosed by a metal belt member (cf., e.g., U.S. Pat. No. 3,075,245; Cl. 425–77, published January 29, 1963).

In the abovementioned apparatus the area between the punches and the belt is filled with a solid medium plastic under pressure, such as pyrophilite or catlinite (lithographic stone). The frustoconical ends of the punches in conjunction with the belt member define a high pressure vessel or chamber accommodating the solid medium, i.e. pyrophilite or catlinite, which surrounds a specimen material in said chamber acting to transmit pressure thereto. Oppositely directed ends of the punches face a press means. Under the action of the press means the punches are caused to move towards the center of the high pressure chamber to thereby compress the solid medium surrounding the specimen being tested and the medium disposed between the punches and the metal belt. A certain amount of the solid medium tends to flow into a gap between the punch assemblies and the belt member which affords the punches to be driven towards each other. The remainder of the solid medium is subjected to compression which causes a high pressure to arise therein. A certain distribution between a portion of the solid medium that flows out of the chamber and that which is subjected to compression enables the punches to be driven towards each other and obtain high pressure in the solid medium surrounding the specimen. As the punches are driven together, the gap between the punches and the belt member decreases which results in less solid medium to flow therethrough.

Finally, the punches terminate their reciprocal approach due to the fact that, regardless of a further possible increase in the force applied to the outer ends thereof, the gap between the punches and the belt assembly becomes so insignificant as to prevent the flow of the solid medium therethrough. The maximum presure in the solid medium and, accordingly, the pressure obtainable in the specimen being tested is determined by the value of compression force exerted on the solid medium enclosing the specimen.

Therefore, the value of obtainable pressure depends on the gap between the punch assemblies and the belt member, which cannot be raised above 70 kilobars.

In addition, in the heretofore described apparatus for producing high pressure the frustoconical punches are subjected to considerable deformation along the longitudinal axis of symmetry thereof under the action of the pressure exerted thereupon by the solid medium surrounding the specimen being tested. Said deformation may result in damage of the punch working surfaces. Further, this deformation reduces the value of pressure obtainable in the solid medium. The reason for the deformation of the working surfaces of the punch assemblies is inherent in the construction thereof, wherein the area of the working surfaces of the punch assemblies which is acted upon by the high pressure produced in the high pressure chamber is several times smaller than that of the punch area (in some instances one tenth of the latter) to which the press effort is applied. As a result, in the punch portion adjoining the solid medium enclosing the test specimen normal axial stresses appear of the magnitude by far exceeding those acting upon the punch surface facing the press means and subjected to a uniformly distributed force from the press means.

In part, the axial deformation of the punch surfaces may be reduced through a constructional arrangement of the punches or dies according to another known apparatus for producing high pressure as exemplified by U.S. Pat. No. 3,854,854, Cl. 425-77, published Dec. 17, 1974.

This apparatus comprises a pair of identical coaxially arranged dies, each of the latter being made up of two portions one of which is a working body with an end thereof being in direct contact with a solid medium plastic under pressure arranged to surround a test sample and subjected to a pressure transmitted thereto by this medium, whereas the other is a base plate with an end thereof facing a common die driving means, the other end facing a second surface of the working body and spaced a certain distance therefrom. The space between the opposed ends of the working body and the base plate is filled with a solid medium plastic under pressure, whereas the surfaces of these ends have identical annular grooves the axes of which coincide with the longitudinal centerline of the die, the inner edges of the grooves encircling the central portions of the working body and the base plate ends, the grooves being at least partially filled with the solid medium plastic under pressure.

The central portion of the bearing face of the working body is acted upon by a force, the value of which is equal to or greater than the force acting upon the face of the working body adjoining the solid medium which surrounds the test sample. Normal stresses appearing in the working body along the longitudinal centerline of the die caused by a pressure developed inside the solid medium surrounding the test sample are compensated for by the normal stresses developed in the working body along the longitudinal centerline of the die under the action of the force applied to the central portion of the working body facing the base plate of the die. This substantially contributes to the reduction of deformation of the working body end adjoining the solid medium surrounding the test sample and affords to produce a much higher pressure in the solid medium surrounding the test sample. However, the aforedescribed constructional arrangement fails to provide an omnidirectional force to be exerted upon the working body which, in turn, does not allow to obtain pressures in excess of 150 kilobars.

Still another known apparatus for producing high pressure, a ball-type apparatus, comprises a multi-die system in the form of a solid body of regular geometry, such as a ball or a cylinder, separated by the planes passing through the symmetry axis thereof (cf., e.g., British Pat. No. 1,200,934; Cl. B 01j 3/00, published Aug. 5, 1970).

The abovementioned apparatus features dies which are truncated at the ends thereof facing a sample being tested defining thereby a high pressure chamber containing a solid medium plastic under pressure, such as pyrophilite or catlinite, arranged to enclose the test sample. The die ends opposite to the respective truncated ends face a common die actuating means, whereas a space between the side faces of the dies is partially filled with a solid medium plastic under pressure such as catlinite or pyrophilite.

Under the action of a force exerted upon the die ends facing the common die driving means (in this case a liquid, e.g. kerosene compressed by means of a compressor) the dies are caused to move towards the test sample and thereby act to exert pressure upon the solid medium enclosing the sample being tested and the solid medium contained in the gaps between the side faces of the dies. Part of the media is caused to flow into the gaps between the die side faces which enables the dies to progress towards the center of the high pressure chamber. The solid medium which tends to remain in the high pressure chamber is therefore subjected to compression which results in a pressure produced therein.

Finally, the dies terminate their reciprocal approach due to the fact that, regardless of a further possible increase in the force applied by the die driving means to the outer ends thereof, the gap between the adjoining side faces of the dies tends to become so insignificant as to prevent the flow of the solid medium therethrough. A maximum pressure obtainable in the solid medium and, accordingly, in the test sample is determined by the value of compression force exerted upon the solid medium enclosing the test sample. The surface area of the die end facing the die driving means is several times greater than that of the die end adjoining the solid medium enclosing the test sample. Accordingly, the value of compression forces acting upon the die ends are inversely proportionate to the surface area thereof.

In the absence of an omnidirectional and uniformly distributed compression force acting upon the die end adjoining the solid medium enclosing the test sample, high stresses tend to develop, which stresses impart considerable axial deformation to the die in the direction from the center of the high pressure chamber towards the outer end of the die. This presents a major problem in producing a higher pressure in the high pressure chamber.

In order to provide a more uniform stress distribution in the die portion adjoining the solid medium enclosing the test sample, the dies can be arranged according to the invention described hereinabove (i.e. U.S. Pat. No. 3,854,854; Cl. 425-77, published Dec. 17, 1974).

The combined features of the both inventions provide an apparatus for producing high pressure of the ball type with each die made up of two parts along the longitudinal centerline thereof and enable to obtain a very high pressure (e.g., in excess of 300 kilobars) in the solid medium surrounding a test sample. However, such an apparatus has a high pressure chamber of small volume.

The hereinbefore described apparatus for producing high pressure (i.e. U.S. Pat. No. 3,854,854; Cl. 425-77, published Dec. 17, 1974) comprises a multi-die system each die, as was already described hereinbefore, being made up of two parts arranged coaxially, one of the parts being a working body with a face end thereof directly contacting a solid medium plastic under pressure arranged to surround a test sample and subjected to a pressure transmitted thereto by this medium, the other being a base plate with an end thereof facing a common die driving means, another end facing a second surface of the working body and spaced a certain distance therefrom. The space between the opposed ends of the working body and the base plate is filled with a solid medium plastic under pressure, whereas the surfaces of these ends have identical annular grooves the axes of which coincide with the longitudinal centerline of the die, the inner edges of the grooves encircling the central portions of the working body and the base plate ends, the grooves being at least partially filled with the solid medium plastic under pressure.

The central portion of the bearing face of the working body is acted upon by a force, the value of which is equal to or greater than the force acting upon the face of the working body adjoining the solid medium which surrounds the test sample. Normal stresses appearing in the working body along the longitudinal centerline of the die caused by a pressure developed inside the solid medium surrounding the test sample are compensated for by the normal stresses developed in the working body along the longitudinal centerline of the die under the action of the force applied to the central portion of the working body facing the base plate of the die. This substantially contributes to the reduction of deformation of the working body end adjoining the solid medium surrounding the test sample and affords to produce a much higher pressure in the solid medium surrounding the test sample.

The die working body of the heretofore described high pressure producing apparatus fails to effectively utilize the force acting upon the central portion of the working body end facing the base plate and by far exceeding the force acting upon the working body end adjoining the solid medium surrounding the test sample.

SUMMARY OF THE INVENTION

It is an object of the present invention to provide an apparatus for producing high pressure wherein a working body of each die is arranged in such a way as to employ most effectively the force acting upon the central portion of the working body facing a base part of the die to thereby afford an additional compression force to act on a solid medium enclosing a sample being tested which could cause an increase in the resultant pressure produced both in the medium and the sample.

This object is attained in an apparatus for producing high pressure, comprising a multi-die system wherein each die is made up of two cooperating parts arranged along the longitudinal centerline thereof, one part being a working body with one end thereof adjoining a solid medium plastic under pressure adapted to enclose a test sample subjected to a pressure transmitted by the solid medium thereto upon the dies being driven towards each other, the other part being a base member with one end thereof facing a die driving means common to all the dies and with the other end thereof facing another end of the working body and spaced a certain distance therefrom, the space between said ends being filled with a solid medium plastic under pressure, the surfaces or faces of said last-mentioned ends being provided with identical annular grooves, the axes thereof essentially coinciding with the longitudinal centerline of the die, the inner edges of said grooves defining central portions of the working body and the base of the die respectively and said grooves being at least partially filled with a solid medium plastic under pressure, in which apparatus, according to the invention, the working body of each die is made up of two parts in the direction essentially perpendicular to the longitudinal centerline of the die, said parts being a central insert and a ring arranged to encircle the insert, both capable of relative displacement towards the test sample, whereas the surface area of the central insert end facing the base end having the annular groove approximates to or less than the surface area of the central portion of said base end.

By virtue of the aforedescribed constructional arrangement of the working body of each die, the force acting upon the end face of the central insert adjoining the die base member is most effectively utilized. Under the action of this force, by far exceeding in value the force exerted upon the central insert by the solid medium enclosing the test sample, the central insert is subjected, in the first place, to omnidirectional compression which leads to the reduction of the stress gradient therein; secondly, to longitudinal axial deformation causing no damage thereto; and thirdly, to displacement towards the test sample relative to encircling ring which, in turn, results in an additional compression of the solid medium surrounding the test sample acting to increase the value of pressure both in the medium and the sample tested.

The central insert of the working body can be shaped as a rectilinear cylinder or, alternatively, it can take the form of a truncated cone, the basis of which serves to directly cooperate with the solid medium surrounding a sample tested.

It is desirable that the central insert and the encircling ring be separated by a gasket acting to reduce friction therebetween.

It is expedient that an explosive be used in the space between the ends of the central portions of the working body and the base member as a solid medium plastic under pressure to provide additional advancement of the central insert towards the sample tested.

It is further desirable that a piezoelectric element be provided acting to contact the end of the central insert of the die working body adjoining the grooved end of the working body and to enable less friction between the central insert and the encircling ring.

It is possible for the working body of the die to be provided with at least one more ring arranged coaxially in relation to the ring encircling the central insert of the working body.

It is further possible that a gasket be accommodated between the coaxial rings, the gasket to be made from a material contributing to less friction therebetween.

The foregoing constructional arrangement of the apparatus for producing high pressure according to the invention affords to expand the range of high pressure obtainable and to increase the volume of a solid medium plastic under pressure surrounding a sample being tested. This provides a wider application of the apparatus in research and industry.

BRIEF DESCRIPTION OF THE DRAWINGS

The invention will now be described in greater detail with reference to specific embodiments thereof taken in conjunction with the accompanying drawings, in which:

FIG. 1 illustrates an apparatus for producing a high pressure of the ball type, a longitudinal sectional view, according to the invention;

FIG. 2 shows another modification of the high pressure producing apparatus of the belt type, a longitudinal sectional view, according to the invention;

BEST MODE FOR CARRYING OUT THE INVENTION

Figure 3:
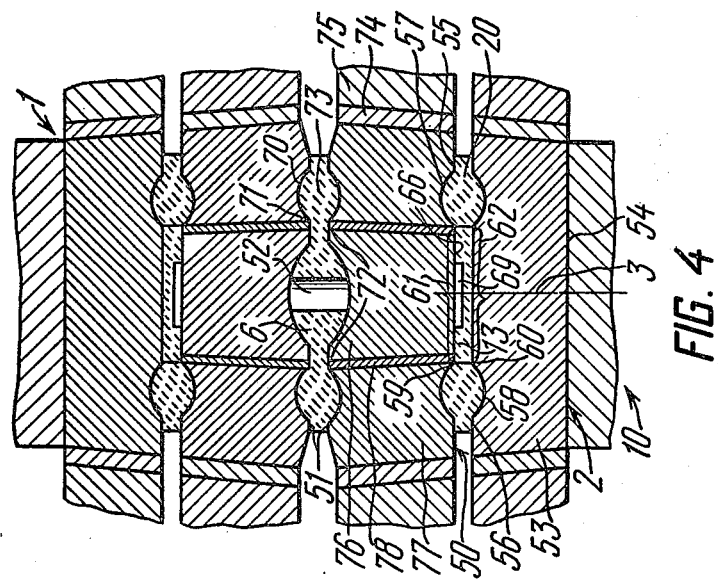
FIG. 3 shows still another modification of the apparatus for producing high pressure comprising a pair of dies, a longitudinal sectional view, according to the invention.

An apparatus for producing high pressure of the ball type according to the invention comprises a multi-die system 1 (FIG. 1), in the herein disclosed embodiment of the invention a six-die system. Each pair of dies 2 of the system are spaced apart along a common longitudinal centerline 3, disposed essentially in opposition to one another and shaped as sectors, the sectors defining a sphere or a ball in conjunction with the other four sectors of the dies 2.

Each die 2 of the system 1 is made up of two parts in the direction of the longitudinal centerline 3 thereof.

One part of the die 2 is a working body 4, an end 5 thereof directly cooperating with a solid medium 6 which is plastic under pressure and adapted to enclose a test sample 7, the latter being subjected to a pressure transmitted thereto by the medium 6 when the dies 2 are driven towards each other. In the embodiment disclosed herein a lithographic stone such as catlinite is used as the medium 6.

Another part of the die 2 is a base member 8, one end 9 of which faces a driving means 10 common to all the dies 2.

Other ends 11 and 12 of the working body 4 and the base member 8 respectively are spaced a certain distance from one another. The space between the ends 11 and 12 is filled with a solid medium 13 plastic under pressure, for example a medium which is identical to that used for transmitting pressure to the test sample 7, in the herein disclosed embodiment an explosive, such as an alloy of 36 percent by weight of trinitrotoluene and 64 percent by weight of hexahydrotoluene. The use of either trinitrotoluence or hexahydrotoluene also has been found advantageous. The faces or surfaces of the ends 11 and 12 are provided with identical grooves 14 and 15 respectively, the axes of which coincide with the longitudinal centerline 3 of the die 2. Inner edges 16 and 17 of the grooves 14 and 15 define central portions 18 and 19 of the ends 11 and 12 of the working body 4 and the base member 8 respectively. The grooves 14 and 15 are filled with a solid medium 20 plastic under pressure, in the herein disclosed embodiment a lithographic stone such as catlinite. Alternatively, the grooves may be filled only partially with this medium.

The working body 4 of each die 2 is made up of two parts in the direction essentially perpendicular to the longitudinal centerline 3 of the die 2, the parts being a central insert 21 and an encircling ring 22 both disposed coaxially and capable of relative advancement towards the test sample 7.

The central insert 21 has the form of a rectilinear cylinder. The surface area of the end 23 of the central insert 21 is less than that of the central portion 18 of the end 11 of the working body 4. The solid medium 13 provides additional advancement of the central insert 21 towards the test sample 7 upon detonation.

Disposed between the central insert 21 and the encircling ring 22 is a gasket 24 made from material capable of reducing internal friction therebetween. In this instance, the gasket 24 is made of lead. Alternatively, other materials such as copper, tin or fluoroplastic may be used.

Arranged for intimate contact with the end 23 of the insert 21 is a piezoelectric element 25 also serving to reduce friction between the insert 21 and the encircling ring 22.

In the herein disclosed embodiment of the invention the die driving means 10 is a liquid 26, kerosene in this case, fed under pressure via a capillary tube 27 into the hollow defined by a spherical shell 28 fabricated from a resilient material such as rubber directly cooperating with the base members 8 of the dies 2 and a spherical shell 29 made of steel.

The working bodies 4 of the dies 2 are separated from one another by a solid medium 30 plastic under pressure, such as pyrophilite.

Preferably, the dies are manufactured from tungsten carbide, titanium carbonitride and superhard materials such as diamond and cubical boron nitride. The central insert 4 is to be made from the hardest materials, since pressures of greatest magnitude are exerted thereon.

The aforedescribed embodiment affords to obtain pressures in excess of 200 kilobars, the volume of the solid medium surrounding a sample tested being in the order of 1 cm$^3$.

For obtaining pressures between 100 and 150 kilobars in volumes of up to 100 cm$^3$ it is expedient to use a high pressure producing apparatus of the belt type with reference to FIG. 2, wherein the multi-die system 1 is comprised of two dies 2 arranged along the common longitudinal centerline 3 in opposition to one another.

Each die 2 of this system 1 is similar to the dies 2 of the apparatus as shown in FIG. 1, i.e. it is made up of two parts in the direction of the longitudinal centerline 3 (FIG. 2) thereof. Described hereinafter are only those components of the dies that have dissimilar geometry and are indicated by different numerals.

One part of the die 2 is a working body 31, an end 32 of which serves to directly cooperate with a solid medium 6 plastic under pressure surrounding the test sample 7.

Another part of the die 2 is a base member 33, an end 34 of which faces a die driving means 10 common to all the dies 2.

Other ends 35 and 36 of the working body 31 and the base member 33 respectively are spaced a certain distance from one another. The space between the ends 35 and 36 is filled with a solid medium 13 plastic under pressure. The faces of the die ends 36 and 36 are provided, with identical annular grooves 14 and 15 respectively. Inner edges 16 and 17 of the grooves 14 and 15 define central portions 37 and 38 of the die ends 35 and 36 of the working body 31 and the base member 33 respectively. The grooves 14 and 15 are filled with a solid medium 20 plastic under pressure.

The working body 31 of each die 2 is made up of two parts in the direction essentially perpendicular to the longitudinal centerline 3 of the die 2, the parts being a central insert 39 and an encircling ring 40 arranged coaxially and accomodating therebetween a gasket 41 made from a material similar to that used in the gasket 24 with reference to FIG. 1.

The surface area of the end 42 (FIG. 2) of the central insert 39 is less than that of the central portion 37 of the end 35 of the working body 31.

Arranged for intimate contact with the end 42 of the central insert 39 is a piezoelectric element 43.

In the embodiment herein described the solid medium 6 plastic under pressure, disposed between the ends 32 of the working bodies 31, and to some extent the side surfaces of the working bodies 31 adjoining the solid medium 6 are bounded by a metal belt 44, the inner circumference thereof being in contact with a solid medium 45 which is plastic under pressure, for example, pyrophilite.

A hydraulic press can be used as a means 10 for driving the dies 2.

A simpler constructional arrangement of a high pressure producing apparatus according to the present invention is illustrated in an embodiment with reference to FIG. 3.

The apparatus comprises a pair of dies 2 incorporated into a multi-die system 1 identical to the die 2 with reference to FIGS. 1 and 2 arranged along a common longitudinal centerline 3 in opposition to one another. Each die 2 of this system is made up of two parts arranged in the direction of the common longitudinal centerline 3 in opposition to one another. One part of the die 2 is a working body 50, an end 51 of which serves to directly cooperate with the solid medium 6 plasic under pressure surrounding a test sample 52. Another part of the die 2 is a base member 53, an end 54 thereof facing a common die driving means 10.

Other ends 55 and 56 are spaced a certain distance from one another, the space therebetween being filled with a solid medium 13 plastic under pressure.

The faces of the die ends 55 and 56 are provided with identical annular grooves 57 and 58 respectively. Inner edges 59 and 60 of the grooves define central portions 61 and 62 of the ends 55 and 56 respectively. The grooves 57 and 58 are filled with a solid medium 20 plastic under pressure.

The working body 50 of each die 2 is made up of two parts in the direction essentially perpendicular to the longitudinal centerline 3 of the die 2, the parts being a central insert 63 and encircling rings 64 and 65 arranged coaxially and capable of relative advancement towards the test sample 52.

In the embodiment herein described the surface area of an end 66 of the central insert 63 is approximately equal to the area of the central portion 61 of the end 55 of the working body 50. The central insert 63 has the form of a rectilinear cylinder. Accommodated between the central insert 63 and the encircling rings 64 and 65 are gaskets 67 and 68 fabricated from a material similar to that used for the gasket 24 with reference to FIG. 1.

Arranged for intimate contact with the end 66 (FIG. 3) of the insert 63 is a piezoelectric element 69.

In the herein disclosed embodiment of the apparatus according to the invention the die driving means 10 is similar to the die driving means 10 with reference to FIG. 2.

The ends 51 of the working bodies 50 are provided with identical annular grooves 70, inner edges 71 of which define central portions 72 accommodating therebetween a solid medium 6 enclosing a test sample 52. The grooves 70 are filled with a solid medium 73 plastic under pressure, such as catlinite or pyrophilite. The working body 50 and the base member 53 of each die are press or shrink fitted into steel binding rings 74 and 75.

The aforedescribed modification of the apparatus according to the invention featuring a pair of rings 64 and 65 adapted to encircle the central insert 63 has been found most advantageous for sample tests where the volume of a solid medium used to enclose a sample being tested is in excess of 30 or 40 cm$^3$.

Figure 4:
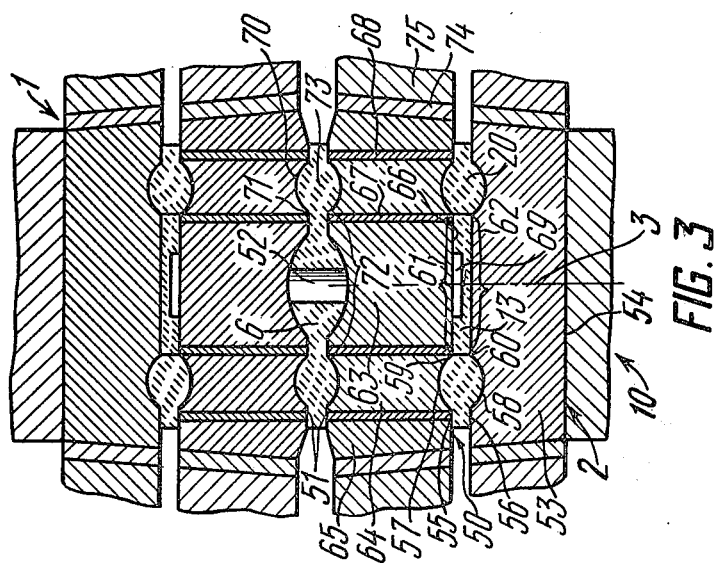
FIG. 4 is one more modification of the apparatus as shown in FIG. 3, a longitudinal sectional view, according to the invention.

A further modification of the apparatus according to the present invention as shown in FIG. 4 is identical in construction to the embodiment with reference to FIG. 3, the difference being in that a central insert 76 of the working body 50 is shaped as a rectilinear truncated cone the basis of which is arranged for direct cooperation with the solid medium 6 surrounding the sample 52.

The central insert 76 is encircled by a ring 77 with a gasket 78 accommodated therebetween, the gasket being fabricated from a material identical to that used for the gasket 24 with reference to FIG. 1.

To make the substance of the present invention readily apparent, the embodiments shown with reference to FIGS. 1 to 4 do not contain a specific illustration of the electric current connection to the piezoelectric elements 25, 43 and 69, neither do they illustrate a wire disposed in the explosive employed (i.e. the solid medium 13) adapted to be heated by electric current supplied thereto to initiate an explosion.

The operating principle of the high pressure producing apparatus according to the present invention is analogous to the embodiments shown in FIGS. from 1 to 4 and will be described hereinafter in greater detail with reference to the embodiment illustrated in FIG. 1.

The die driving means 10 exerts a uniformly distributed force upon the ends 9 of the base members 8 of the dies 2 through the spherical shell 28. Under the action of this force the dies 2 are caused to advance along their respective longitudinal centerlines 3 to thereby compress the solid medium 6 enclosing the test sample 7 and the solid medium 30 both capable of being plastic under pressure. The solid medium 30 tends to flow along the gap between the side surfaces of the dies 2. The solid medium 6 is caused to partially flow into the gap between the side surfaces of the dies 2, whereas the remaining solid medium 6 is compressed and a pressure produced therein is transmitted to the sample 7 being tested. The outflow of the solid media 6 and 30 allows for the dies 2 to reduce the gap between the side surfaces thereof and progress towards the test sample 7 exerting pressure on the solid medium 6.

The surface area of the end 9 of the die 2 is several times greater than that of the end 5 of the working body 4 which affords to create high pressure in the solid medium 6 at a much lower pressure in the liquid 26. This is a major principle enabling to produce high pressure in the solid medium 6 enclosing the test sample 7, which is based on the outflow of and a compression force imparted to the solid medium 6. As the gap between the side surfaces of the dies 2 diminishes, less solid medium escapes into the gap. To provide a further closing of the dies 2 and to obtain a higher pressure in the medium 6, it is necessary to increase the force acting upon the ends 9 of the dies 2, i.e. to increase pressure in the liquid 26, this force, of course, not being proportionate to the pressure increase in the medium 6.

With the growth of pressure in the liquid 26 and the solid medium 6, the die 2 is subjected to a compression force acting along the longitudinal centerline 3 thereof from the ends 9 and 5, the value of this force becoming greater as the pressure in the solid medium and the liquid 26 progressively grows. This compression force is therefore transmitted to the end 11 of the working body 4 and to the end 12 of the base member 8 causing the ends 11 and 12 to move towards each other. Closing of the ends 11 and 12 results in compression of the solid medium 20 in the annular grooves 14 and 15 and in compression of the medium 13 in the space between the central portions 18 and 19 of the working body 4 and the base member 8.

Under the action of the compression force exerted on the solid media 13 and 20, a pressure is produced therein in the following manner. The solid medium 20 partially flows into the gap between the ends 11 and 12 when these ends are driven towards each other. The solid medium 20 remaining in the grooves 14 and 15 is thereby compressed which leads to the generation of pressure therein. This pressure tends to counteract the flow of the solid medium 13 contributing to the fast growth of pressure in the solid medium 13. The volume occupied by the solid medium 13 is several times below that occupied by the solid medium 6. This is because the volume occupied by the solid medium 6 must be such as to accommodate test samples of considerable size. By virtue of the abovesaid and also of the fact that the solid medium 13 is bounded by the solid medium 20, the rate of pressure growth in the solid medium 13 is more active than the pressure growth rate in the solid medium 6. Pressure in the solid medium 13 is determined by the selection of optimal geometry of the central portions 18 and 19 of the working body 4 and the base member 8 and of the annular grooves 14 and 15; by coefficient of internal friction of the solid media 13 and 20 and by the initial volumes of the solid media 13 and 20. An excess force resulting from this pressure acts upon the end 23 of the central insert 21 and causes it to move towards the test sample relative to encircling ring 22 to thereby add to the compression force acting upon the solid medium 6 when the working bodies 4 are driven towards each other, which leads to the growth of pressure in the solid medium 6.

At a certain gap between the side surfaces of the working bodies 4 and at a certain distance between the ends 11 and 12, the flow of the solid media 6, 30 and 20 is terminated which leads to termination of movement of all parts of the dies 2 irrespective of the force applied to the ends 9 of the dies 2 by the die driving means 10. A maximum value of pressure is thus produced in the solid medium 6 resulting from the advancement of the parts of the dies 2 towards the test sample 7 by virtue of the force exerted on the ends 9 by the die driving means 10.

When a maximum pressure is reached in the solid medium 6 resulting from the advancement of the parts of the dies 2 by virtue of the force exerted on the ends 9 by the die driving means 10, an explosion is initiated in the explosive serving as the solid medium 13. Convertion of the solid explosive into a gaseous state during the explosion creates pressure in the gaseous mixture resulting therefrom and leads to additional advancement of the central insert 21 towards the test sample 7 relative to the ring 22. The solid medium 6 is thus subjected to compression which causes pressure to grow therein. The base member 8 of the die 2 remains stationary. Upon consequent cooling of the gaseous mixture resulting from the explosion and a drop in pressure which follows, the space occupied by this gaseous mixture is filled with the solid medium tending to flow thereinto to compensate for the pressure drop.

As is known in dynamic pressures, high pressure in an explosion accounts for 30 percent by the movement of heated molecules in the gaseous mixture resulting from the explosion and for 70 percent by resilient counteraction of the molecules. In the herein proposed apparatus the mass of the metal components by far exceeds the mass of the gaseous products resulting from the explosion which makes the heat of the gaseous products to promptly dissipate in the apparatus leading to no substantial increase in the temperature of its parts. Therefore, in the apparatus according to the invention use is made of pressure resulting from and by virtue of resilient counteraction of the molecules. Accordingly, the solid medium 20 fills no more than one third of the volume originally occupied by the explosive. No limitations are imposed on the high pressure producing apparatus in connection with the use of an explosive, since the explosive is accommodated in an enclosed space and the gaseous products resulting from the explosion never escape the apparatus.

The piezoelectric element 25 is arranged for intimate contact with the end 23 of the central insert 21. Under the action of electric current applied to the piezoelectric element 25, mechanical oscillations of small amplitude are initiated therein to be transmitted to the central insert 21. Oscillation of the central insert 21 contributed to the reduction of friction between the central insert 21 and the encircling ring 22.

The apparatus for producing high pressure according to the invention is simple in construction, easy to operate and requires no extra costs in manufacture. Further, any suitable known die driving means may be used for its operation. High pressures obtainable with this apparatus and the volume of solid medium plastic under pressure employed provide for wider use thereof in research and industry.

Having the foregoing in mind, the apparatus according to the present invention makes it possible to improve such technical parameters of the known high pressure producing apparatuses as the volume of solid medium surrounding a sample being tested and/or pressures obtainable in this medium. For example, the invention described hereinbefore enables to increase the volume of solid medium employed when applied to a known high pressure producing apparatus of the ball type. Conversely, when used with a known belt type apparatus, featuring large volume of the solid medium, the apparatus according to the invention affords to obtain a higher pressure in this medium.

Industrial Applicability

The high pressure producing apparatus may be used for synthesis of extra hard materials employed in the metal working industry and for investigation of physical properties of solid bodies at high and low temperatures and in magnetic feilds under high pressure.

I claim:

1. An apparatus for producing high pressure comprising a multi-die system wherein each die is made up of two cooperating parts arranged along the longitudinal centerline thereof, one part being a working body with one end thereof adjoining a solid medium plastic under pressure adapted to enclose a test sample subjected to a pressure transmitted by the solid medium thereto upon the dies being driven towards each other, the other part being a base member with one end thereof facing a die driving means common to all the dies and with the other end thereof facing another end of the working body and spaced a certain distance therefrom, the space between said ends being filled with a solid medium plastic under pressure, the surfaces or faces of said last-mentioned ends having identical annular grooves, the axes thereof essentially coinciding with the longitudinal centerline of the die, the inner edges of said grooves defining central portions of the working body and the base member ends respectively, the grooves being at least partially filled with a solid medium plastic under pressure, characterized in that the working body (4) of each die (2) is made up of two parts in the direction essentially perpendicular to the longitudinal centerline (3) of the die (2), the parts being a central insert (21) and an encircling ring (22) both arranged coaxially and capable of relative displacement towards the test sample (7), whereas the surface area of the end (23) of the central insert (21) adjoining the end (11) of the working body (4) is provided with the groove (14) approximates to or less than the surface area of the central portion (18) of said end (11).

2. An apparatus for producing high pressure as claimed in claim 1, characterized in that the central insert (21) of the working body (4) is in the form of a rectilinear cylinder.

3. An apparatus for producing high pressure as claimed in claim 1, characterized in that the central insert (76) of the working body (50) is in the form of a truncated cone, the basis of which serves to directly cooperate with the solid medium (6) plastic under pressure surrounding the test sample (7).

4. An apparatus for producing high pressure as claimed in any of the claims 1 to 3, characterized in that a gasket (24) is accommodated between the central insert (21) and the encircling ring (22), the gasket acting to reduce friction therebetween.

5. An apparatus for producing high pressure as claimed in any of the claims 1 to 4, characterized in that an explosive is used in the space between the central portions (18 and 19) of the ends (11 and 12) of the working body (4) and the base member (8) as a solid medium plastic under pressure to provide additional advancement of the central insert (21) of the working body (4) towards the test sample (7) upon detonation.

6. An apparatus for producing high pressure as claimed in any of the claims 1 to 5, characterized in that a piezoelectric element (25) is provided acting to ensure an intimate contact with the end (23) of the central insert (21) of the working body (4) adjoining the end (11) of the working body (4) having the annular groove (14) and to enable less friction between the central insert (21) and the encircling ring (22).

7. An apparatus for producing high pressure as claimed in any of the claims 1 to 6, characterized in that the working body (50) of the die (2) is provided with at least one more ring (65) arranged coaxially in relation to the ring (64) encircling the central insert (63) of the working body (50).

8. An apparatus for producing high pressure as claimed in claim 7, characterized in that a gasket (68) is accommodated between the coaxially arranged rings (64 and 65), the gasket being made from material contributing to less friction therebetween.

* * * * *